United States Patent [19]

Tschoepe

[11] Patent Number: 4,620,303
[45] Date of Patent: Oct. 28, 1986

[54] CIRCUIT ARRANGEMENT FOR THE RECOGNITION OF STATIC AND DYNAMIC FAULTS IN CIRCUIT ASSEMBLIES

[75] Inventor: Norbert Tschoepe, Munich, Fed. Rep. of Germany

[73] Assignee: Siemens Aktiengesellschaft, Berlin and Munich, Fed. Rep. of Germany

[21] Appl. No.: 644,074

[22] Filed: Aug. 24, 1984

[30] Foreign Application Priority Data

Sep. 9, 1983 [DE] Fed. Rep. of Germany ....... 3332626

[51] Int. Cl.⁴ ............................................ G06F 11/00
[52] U.S. Cl. ......................................... 371/16; 371/20
[58] Field of Search ............................ 371/16, 20, 21; 344/200, 900

[56] References Cited

U.S. PATENT DOCUMENTS

| | | | |
|---|---|---|---|
| 4,308,581 | 12/1981 | Raghunathogn | 371/19 |
| 4,377,845 | 3/1983 | Markham | 371/16 |
| 4,410,938 | 10/1983 | Higashiyama | 371/19 |
| 4,535,456 | 8/1985 | Bauser | 371/16 |

OTHER PUBLICATIONS

Hinz, et al., "Program Interrupted by Instruction Address Monitoring", IBM Tech Disclosure Bulletin, vol. 13, No. 4, Sep. 1970.

Primary Examiner—Michael R. Fleming
Attorney, Agent, or Firm—Thomas H. Jackson

[57] ABSTRACT

A central control unit that is connected with a number of circuit assemblies and has two interrupt inputs. Of these interrupt inputs, at first, when the circuit assemblies are in a fault-free state, only the one with the lower interrupt priority is activated. A register is provided, into which, when the circuit assemblies are driven by the central control unit, data with regard to the precise circuit assembly that is being driven in each case can be written. In addition, there is provided at least one fault recognition circuit, which when a fault exists in the respective circuit assembly, emits a fault signal when that assembly is driven. Connected with the abovementioned interrupt inputs is a control device, which, in response to such a fault signal, effects, through the activated interrupt input, the performance of a first interrupt routine, in the course of which the interrupt input with the higher interrupt priority is activated. Before the completion of the interrupt routine then in progress, the circuit assembly designated by the data in the register is driven again. If, a fault signal again occurs when this is done, the control device effects the performance of another interrupt routine through the interrupt input that has just been activated.

2 Claims, 4 Drawing Figures

CIRCUIT ARRANGEMENT FOR THE RECOGNITION OF STATIC AND DYNAMIC FAULTS IN CIRCUIT ASSEMBLIES

BACKGROUND OF THE INVENTION

The invention relates to a circuit arrangement for the recognition of faults occurring in circuit assemblies. Such faults are indicated in each case through the emission of a fault signal and may be either static faults persisting for more than a predetermined first time span or dynamic faults which do not exceed a predetermined second time span, in a central control unit that is connected with these circuit assemblies and drives them for the emission of data signals, particularly in a microprocessor assembly.

If, in a circuit arrangement having a central control unit and a number of circuit assemblies connected with it, the fault control procedure that is necessary when faults occur takes place in the central control unit, then it is advantageous for effective fault control, if a distinction can be made in the central control unit between static and dynamic faults which occur in the circuit assemblies. Depending on the kind of fault that has occurred in each case, different measures will, in general, have to be initiated from the central control unit to control the faults. For example, the presence of a static fault in one of the circuit assemblies may result in this faulty circuit assembly being taken out of service by the central control unit, while the other fault-free circuit assemblies continue to operate without any change. On the other hand, in the presence of a dynamic fault, a statistical evaluation of the fault can first be carried out. Depending on the result of this evaluation in each case, appropriate measures to eliminate the fault will then be initiated by the central control unit. These measures may again include removing the faulty circuit assembly from operation.

SUMMARY OF THE INVENTION

The object of this invention is to show a way in which, for a circuit arrangement of the sort described above, the presence of static and dynamic faults can be detected in the central control unit with a relatively small deployment of circuitry.

This object is accomplished in accordance with the invention for a circuit arrangement of the sort described above by providing the central control unit with a first interrupt input that is activated when the circuit assembly is in a fault-free state, and a second interrupt input which has a higher interrupt priority than the first interrupt and is deactivated when the circuit assembly is in a fault-free state, by providing a register, into which, when the circuit assemblies are driven in order to emit data signals, information with regard to the precise circuit assembly driven in each case can be written, by providing at least one fault recognition circuit, which when a fault exists in the respective circuit assembly, gives a fault signal when that assembly is driven, by connecting to the interrupt inputs a control device, which, in response to such a fault signal, effects, through the first interrupt input, the performance of an interruption routine in the central control unit, which serves to determine the presence of dynamic faults, in the course of which the second interrupt input is activated, and by having the control device, in the event that a fault signal reoccurs before the completion of the interrupt routine that is then in progress, effect, in response to the driving of the circuit assembly that is designated in the register, the performance of a further interrupt routine through the second interrupt input, which serves to determine the presence of static faults, and is now activated.

The invention has the advantage that static and dynamic faults can be recognized with only a small additional dynamic loading of the central control unit.

Other features and advantages of the present invention will become apparent from the following detailed description, and from the claims.

For a full understanding of the present invention, reference should now be made to the following detailed description and to the accompanying drawings.

DETAILED DESCRIPTION

Figure 1:
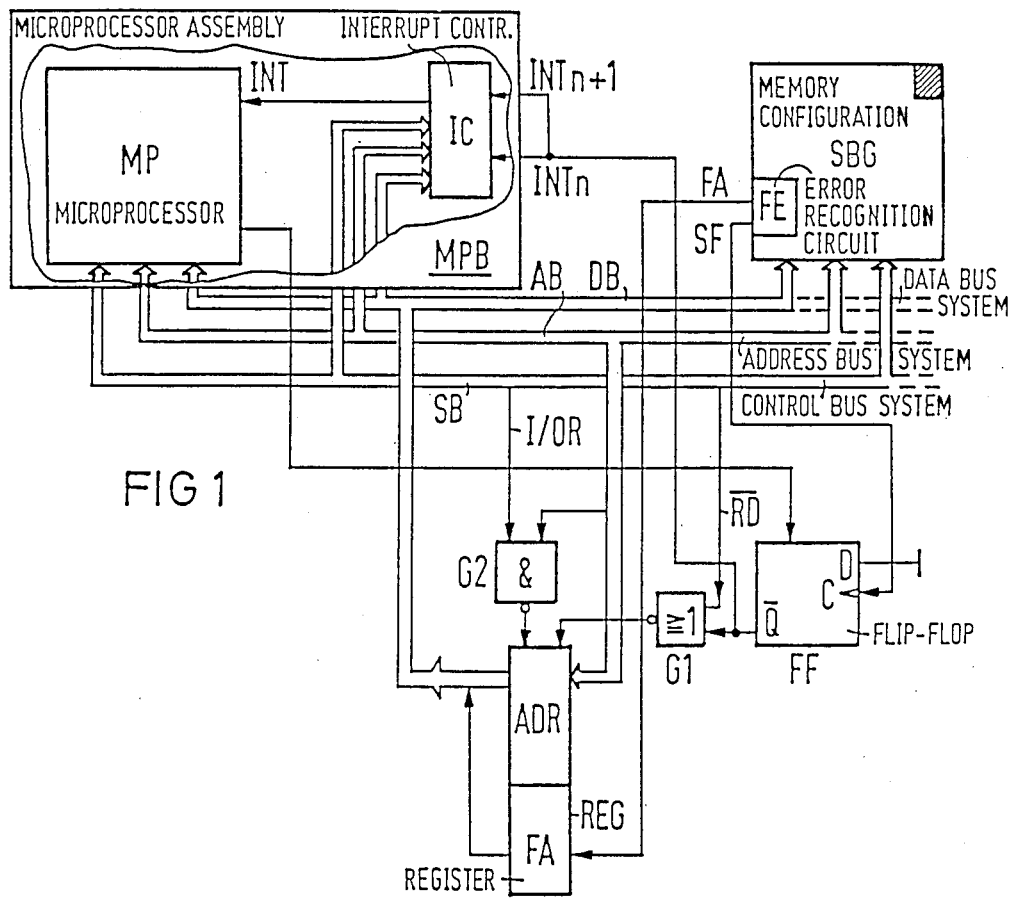
FIG. 1 shows diagrammatically a circuit diagram of a section of the microprocessor system which utilizes the invention.

FIG. 1 shows a section of a microprocessor system. This system has a microprocessor assembly MPB, of which only a microprocessor MP and an interrupt control IC belonging to it, with several interrupt inputs INTn, INTn+1, are shown. On its output side, for the emission of an interrupt signal which causes an interruption of one of the processes controlled by microprocessor MP, this interrupt control is connected with an interrupt control input INT of microprocessor MP. Data inputs and outputs of interrupt control IC are connected to a data bus system DB, which is used to transmit data signals to or from the microprocessor. Through this data bus system, on the one hand, information signals are transmitted, together with an interrupt signal, to the microprocessor. These signals contain data with regard to the level of the interrupt priority of the interrupt signal occurring precisely at one of the interrupt inputs and forwarded to the microprocessor. On the other hand, as will be explained later on, individual interrupt inputs of the interrupt control can be activated or deactivated from the microprocessor through this data bus system by means of appropriate signals.

Microprocessor MP and interrupt control IC are also connected with an address bus system AB, which is used for the transmission of address signals, and with a control bus system SB, through which control signals are transmitted. The control signals in question are used to control the communication between microprocessor MP and the elements of the microprocessor system that are connected to it. Control signals of this kind include write and read signals for the control of memory configurations or peripheral equipment. The only representation of these memory configurations and peripheral equipment units belonging to the microprocessor system in FIG. 1 is a memory configuration designated by SBG.

The memory configuration SBG, which is connected to the bus system described above, possesses, in the embodiment discussed here, a fault recognition circuit, designated in FIG. 1 as FE, which upon reading out a storage cell, checks its content against an existing coding fault and, if necessary, corrects the latter. For this purpose, the data signals to be transmitted within the microprocessor system are coded according to the code known as the "Hamming code". This code makes it possible to correct 1-bit faults and to recognize 2-bit faults. Upon the recognition of one of these faults, the fault recognition circuit FE emits an appropriate fault signal at a fault output SF. In addition, at an output designated FA, it emits an information signal, which states whether the coding that has been recognized as faulty can be corrected or not.

The fault output SF of the memory configuration SBG, which has just been mentioned, is connected with the clock input of flip-flop circuit FF. The flip-flop in question is a so-called D flip-flop, whose D-input is connected to ground or to a voltage corresponding to the logic 0 level, and whose output $\overline{Q}$ can be set at a specified output state from the microprocessor MP. In this case the output designated by $\overline{Q}$ is connected to the interrupt inputs INTn and INTn+1 of the abovementioned interrupt control of microprocessor assembly MPB. Here, n or n+1 is used to show the level of interrupt priority assigned to the respective interrupt inputs. In other words, an interrupt signal applied to inut n+1 has priority over a similar signal applied to input n. It should be noted at this point that when the microprocessor is in a fault-free state, only the interrupt input INTn is activated. The interrupt input INTn+1 is initially deactivated. As has already been explained, the activation or deactivation of the individual interrupt inputs is accomplished by signals transmitted from the microprocessor over data bus system DB. For receiving these signals, interrupt control IC is driven by address bus system AB and control bus system SB.

The output designated by $\overline{Q}$ of flip-flop FF is also connected to the input of NOR element G1. At another input, this NOR element receives a read signal RD that is transmitted over control bus system SB, with which a storage cell of memory configuration SBG is read out. The output of NOR element G1 is connected to a release input of a register REG, having two separate register sections. The first register section, designated ADR, is used to receive the addresses transmitted over address bus system AB. For this purpose, it contains a number of register locations that corresponds to the number of the address bits belonging to an address. At its output side, this register section, at an appropriate command from microprocessor MP, feeds the address that is stored in it to data bus system DB.

In a second register section of the register REG, which is designated by FA, is received the information signal emitted by output FA of memory configuration SBG when a coding fault is recognized. This information signal is emitted, together with the address stored in register section ADR, to data bus system DB when an appropriate command is given. The command just mentioned to register REG for the output of the signals that are stored in it is given with the aid of a NAND element G2. This NAND element receives at one of its inputs a read signal I/OR transmitted from the microprocessor over control bus system SB, with which transmission of signals stored in input/output devices are controlled. Another input of NAND element G2 is connected with an address line of address bus system AB, over which an appropriate address signal for addressing register REG as an output device is transmitted.

Figure 2A:
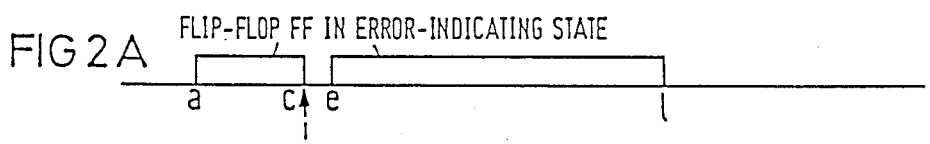
FIG. 2A shows the states of the flip-flop FF shown in FIG. 1.
Figure 2B:
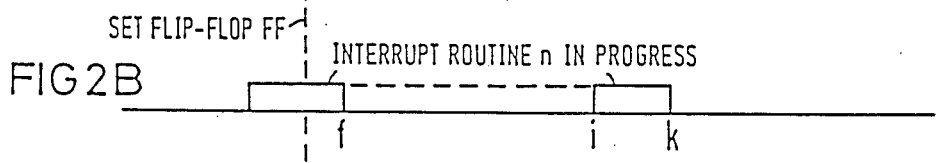
FIG. 2B shows the performance of an interrupt routine n in the microprocessor assembly shown in FIG. 1.
Figure 2C:
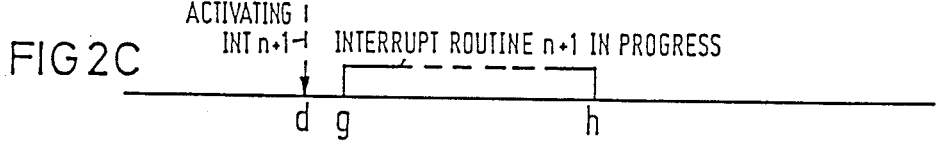
FIG. 2C shows the performance of a second interrupt routine n+1 in the microprocessor assembly shown in FIG. 1.

The mode of operation of this circuit arrangement will now be explained with reference to FIG. 2. For this purpose, we shall assume that the microprocessor system shown in FIG. 1 is initially in a fault-free state. In this state flip-flop FF is set from the microprocessor in such a way that it emits a logic 0 level at its $\overline{Q}$ output. The interrupt input INTn+1 of interrupt control IC is, as has already been mentioned, deactivated in the fault-free state. Now if read signals RD are emitted from the microprocessor to read out the signals stored in the storage cells of memory configuration SBG, then register REG is released through NOR element G1 with every read signal for the reception of the address transmitted over address bus system AB, together with the respective read signal. With each address received in this manner, a previously stored address is overwritten. If during the read-out of one of the memory locations by fault recognition circuit FE a coding fault is recognized and, if necessary, corrected, then the circuit emits a fault signal at its output SF and an information signal at its output FA. The information signal, which is received in the register section FA of register REG indicates to microprocessor MP, as has already been described above, whether the coding fault was correctible or not. When a fault signal is present, flip-flop FF switches to a fault-indicating state (a in FIG. 2A). This state is characterized by a logic 1-level at the output $\overline{Q}$. This logic level effects the locking of the NOR element G1, so that the address of the storage cell containing the faulty content, which has just been received in register REG, cannot be overwritten by other addresses.

In the fault-indicating state, a logic 1-level exists at the $\overline{Q}$ output of flip-flop FF. This logic level is interpreted by interrupt control IC as an interrupt signal and forwarded to microprocessor MP. Since the interrupt input n+1 is initially deactivated here, an information signal is transmitted to the microprocessor in addition to this interrupt signal, which assigns interrupt priority n to the interrupt signal. On the basis of these signals, the microprocessor terminates the processes then controlled by it and starts an interrupt routine (b in FIG. 2B) corresponding to interrupt priority n. In the course of this interrupt routine, the microprocessor receives the address stored in register REG and the information signal stored in register section FA. Then flip-flop FF is returned to its starting position (c in FIG. 2A). In addition, interrupt input n+1 of interrupt control IC is now activated (d in FIG. 2C).

After reception of the address stored in register REG together with the information signal stored in register section FA, the memory location corresponding to this address is read out again from the microprocessor. If an examination of the memory content by the fault recognition circuit FE shows that a coding fault is again present, then flip-flop FF returns again to its fault-indicating state (e in FIG. 2A). Interrupt control IC recognizes an interrupt signal through the interrupt input n+1, which is now activated, and forwards this signal to the microprocessor, giving an interrupt priority of n+1. Since this interrupt signal has a higher interrupt priority than the interrupt signal which has triggered the interrupt routine that is just taking place, the interrupt routine that is just taking place is interrupted (f in FIG. 2B), and an interrupt routine corresponding to the interrupt priority n+1 is commenced (g in FIG. 2C). After completion of the interrupt routine n+1 (h in FIG. 2C), the initially interrupted interrupt routine n is continued (i to k in FIG. 2B). Before the completion of this interrupt routine, flip-flop FF is again put into its starting position, in order to recognize any further faults in the memory configurations SBG (1 in FIG. 2A).

As a result of the interlocking performance of the interrupt routines n and n+1, which has just been described, it is possible to determine static faults that exceed a prescribed first time span or dynamic faults that do not exceed a prescribed second time span, in memory configuration SBG. The measures that are required when dynamic faults occur are controlled by the performance of interrupt routine n without interruption caused by an interrupt signal with interrupt priority n+1. On the other hand, if an interruption of interrupt routine n takes place, as will be the case in the event of a static fault, then the measures required when static faults occur are controlled by interrupt routine n+1.

Up to now we have considered only the case in which static or dynamic faults have been determined in memory configuration SBG as a result of performing the two interrupt routines. The circuit arrangement in accordance with the present invention is, however, not restricted to the determination of faults of this kind occurring in memory configurations. It can be used, instead, to determine the presence of static and dynamic faults in any desired circuit assemblies that are connected through the abovementioned bus systems AB, DB and SB with the microprocessor assembly MPB and can be driven through these systems from the microprocessor assembly for the emission of data signals.

If several such circuit assemblies are connected with microprocessor assembly MPB through the bus system, then each of the circuit assemblies can have its own fault recognition circuit FE. In this case the outputs of the individual fault recognition circuits, which are shown in FIG. 1, must be connected in each case with an OR element, whose output is connected to flip-flop FF or to register section FA of register REG.

In the event that several circuit assemblies are connected through the abovementioned bus systems with the microprocessor assembly MPB, it is also possible to provide, instead of a number of fault recognition circuits that corresponds to the number of circuit assemblies, a single joint fault recognition circuit, which is centrally located in the microprocessor assembly.

Finally, it should be pointed out that an INTEL 8259 integrated circuit can be used for the abovementioned interrupt control IC. Additionally, the fault recognition circuit FE can be made from an Advanced Micro Devices, Inc., circuit 2960.

There has thus been shown and described a novel circuit arrangement for the recognition of static and dynamic faults in circuit assemblies which fulfills all the objects and advantages sought therefor. Many changes, modifications, variations and other uses and applications of the subject invention will, however, become apparent to those skilled in the art after considering the specification and the accompanying drawings which disclose embodiments thereof. All such changes, modifications, variations and other uses and applications which do not depart from the spirit and scope of the invention are deemed to be covered by the invention which is limited only by the claims which follow.

What is claimed is:

1. In a circuit arrangement for the recognition of faults occurring in circuit assemblies, the faults being indicated by these circuit assemblies in each case by the emission of a fault signal, which faults detected by a detector means may be either static faults persisting for more than a predetermined first time period or dynamic faults which do not exceed a predetermined second time period, the fault signals being recognized at a central control unit, which central control unit is connected to these circuit assemblies and drives them for the emission of data signals including the fault signals, the improvement wherein the said central control unit has a first interrupt input that the central control unit activates when the circuit assemblies are in a fault-free state in which a fault recognition circuit emits no fault signal and a second interrupt input, having a higher interrupt priority than the first interrupt input, which the central control unit deactivates when the circuit assemblies are in the said fault-free state;

a register is provided, into which register, when the circuit assemblies are driven to emit the data signals, address information with regard to the just driven circuit assembly by the central control unit is written;

at least one such fault recognition circuit is provided, which, when a fault exists in a respective circuit assembly, emits a fault signal when that circuit assembly is driven; and a control device is connected to the first and second interrupt inputs of the central control unit, which, in response to such a fault signal, effects, through the first interrupt input, the performance of a first interrupt routine in the central control unit, which first interrupt routine serves to determine the presence of dynamic faults, in the course of which first interrupt routine, the central control unit activates the second interrupt input and again drives the circuit assembly designated by the address stored in the said register, and the control device effects, in the event that the said fault recognition circuit again emits a fault signal, the performance of a second interrupt routine, which serves to determine the presence of static faults and interrupts the performance of the said first interrupt routine.

2. The circuit of claim 1, wherein said central control unit is a microprocessor.

* * * * *